United States Patent [19]
Allen et al.

[11] Patent Number: 5,561,169
[45] Date of Patent: Oct. 1, 1996

[54] PROCESS FOR THE PRODUCTION OF LIGHTWEIGHT POLYURETHANE MOULDINGS

[75] Inventors: Marnie M. Allen, Guelph; Aaron W. Beazley, Hamilton; Daniel J. Hutchinson, Fergus, all of Canada

[73] Assignee: Conix Canada (PolyCon Division), Concord

[21] Appl. No.: 628,369

[22] Filed: Apr. 5, 1996

Related U.S. Application Data

[62] Division of Ser. No. 431,725, May 1, 1995, Pat. No. 5,532,280.

[51] Int. Cl.$^6$ .................................... C08J 9/32; C08J 9/34
[52] U.S. Cl. ................................................ 521/51; 521/54
[58] Field of Search ........................................ 521/51, 54

[56] References Cited

U.S. PATENT DOCUMENTS 5,244,613  9/1993  Hurley et al. ............................. 264/50

OTHER PUBLICATIONS

Paper given by James Burg at the International Congress and Exposition; Detroit, Michigan; Feb. 27–Mar. 2, 1995. "Lightweight Reaction Injection Molded Polyurethane for Automotive Fascia".

Paper given by M. Hurley, B. Lee, S. Lewandowski and T. Smith at International Congress and Exposition; Detroit, Michigan; Feb. 27–Mar. 2, 1995 "Advances in Competitive Polyurethane Materials for Automotive Fascia".

*Primary Examiner*—Morton Foelak
*Attorney, Agent, or Firm*—Jane Parsons

[57] ABSTRACT

A low density RRIM/RIM article formed of rigid foamed polyurethane which has incorporated in it, hollow glass microspheres with a compressive strength greater than 4,000 psi and a maximum size of 120 microns. This low density RRIM/RIM fascia may have physical properties and continuous high gloss painted outer skin comparable to conventional RRIM/RIM products while having reduced density in comparison to such product.

9 Claims, No Drawings

PROCESS FOR THE PRODUCTION OF LIGHTWEIGHT POLYURETHANE MOULDINGS

RELATED APPLICATIONS

This application is a divisional application of U.S. patent application Ser. No. 08/431,725, U.S. Pat. No. 5,532,280 filed May 1, 1995 by the same inventors and assigned to the same assignee.

FIELD OF THE INVENTION

This invention relates to methods of RIM molding processes and resultant moldings having high impact strength and capable of quality surface finishing for fascias of automobiles.

BACKGROUND OF THE INVENTION

Reaction Injection Molding (RIM) is a process involving filling a closed mold with highly reactive liquid starting components within a very short time to produce a rigid microcellular product having a continuous outer skin. The RIM process is important in the production of external automotive body components.

The RIM process involves the mixing of a polyisocyanate component with a isocyanate-reactive components and simultaneous injection of this mixture into a mold for subsequent rapid curing. The polyisocyanate component is typically based on a liquid polyisocyanate. The isocyanate-reactive component contains a high molecular weight isocyanate-reactive component, typically a polyol and/or an amine polyether and usually contains a chain extender containing amino and/or hydroxyl groups.

The properties of the resulting product are dependent on a large number of variables such as the nature of the starting liquid components, the amount and quality of nitrogen dissolved in the isocyanate-reactive component (nucleation) and the amount and character of other additives which may include a variety of fillers. Such fillers may include materials such as fibreglass, mineral fillers or solid and/or hollow microspheres of a glass or ceramic material.

The RIM process is a complex process. It is sensitive to reaction conditions such as the presence and type of nucleating agents, the liquid reactants etc. Moreover, the product produced, especially for exterior automotive applications, have stringent requirements. Automotive fascias must have mechanical properties in order to pass the required strength, thermal, impact, durability tests etc. Exterior automotive components must also have a highly decorative finish provided by high gloss painting. For example, a fascia for an automobile must have a continuous high gloss outer skin, be lightweight and pass impact tests as required in various jurisdictions.

Fascias and other automotive products can be provided by other less expensive molding processes such as from thermoplastic olefin materials. Generally the advantages of such materials is in price and density reduction rather than quality. An advantage of RRIM/RIM moldings have over thermoplastic materials is the ability to sand the surface of the molded product to remove all visible parting lines without producing surface defects. The problems encountered with other low density fillers producing low density RRIM/RIM products for automotive exteriors was the presence of pitting on the surface of the painted part at the sanded areas. This pitting is due to the breakage of the low density fillers. Therefore, there is a considerable advantage to produce a RRIM/RIM automotive fascia which maintains the surface and physical qualities of RIM products but which has a density and price comparable with thermoplastic olefin materials.

Due to the weight and cost advantages of thermoplastic olefin materials for fascia products, there has been considerable previous work done in the efforts of decreasing both cost and density of polyurethane products.

For example U.S. Pat. No. 5,244,613 issued Sep. 14, 1993 to Hurley et al. discloses the use of expanded organic microspheres encapsulating a blowing agent as means of reducing the density of a rigid RRIM molding. U.S. Pat. No. 3,866,653 issued 1975 to Ahmad discloses the use of hollow glass or ceramic microspheres in an elastomeric polyurethane to be used in the cavity of a pneumatic tire. U.S. Pat. No. 4,839,393 issued Jun. 13, 1989 to Buchanan et al. This patent discloses the use of glass beads and/or bubbles to be mixed with polyurethane foam chips as a filler to increase the volumes of foams while controlling the lightness in weight. These polyurethane foams are not of the rigid type as utilized for automotive exterior components. U.S. Pat. No. 4,539,345 issued Sep. 3, 1985 to Hansen discloses the use of glass bubbles as a filler for moisture curable polyurethane compositions to be used as adhesives, coatings, sealants or casting resins.

More recent research into the production of a rigid RIM product has resulted in a modified chemical system to produce polymers of greater strength and incorporating, as dual fillers, hollow ceramic microspheres known to cause pitting and wollastokup, a reinforcing filler with poor impact properties.

SUMMARY OF THE INVENTION

The present inventors have found that utilizing a specially selected filler within conventional polyurethane reaction procedures produced products with lower density while maintaining the same physical properties. The painted appearance of these products meet or exceed measurable appearance criteria or rigid RIM fascias molded with conventional fillers and/or other types of hollow glass and/or ceramic microspheres. The selected filler was a hollow glass microsphere having a maximum size of 120 microns and a compressive strength of more than 4,000 psi.

Thus, according to the invention we provide a method of preparing a rigid article of foamed polyurethane, for example, of a polyurethane having an unfilled flexural strength of 30 kpsi or more, having a continuous outer surface skin, the method comprising mixing an organic polyisocyanate-reactive component to form a mixture in a closed mold, allowing the components to react and removing the product from the mold. The improvement involves using up to 6% weight, and preferably from 0.5–4.% by weight (most preferably 1.5–3% by weight) based upon the molded product of a hollow glass microsphere with a compressive strength of less than 4,000 psi and maximum size of 120 microns. Preferably the isocyanate reactive component comprises an isocyanate-reactive component comprising at least one compound containing at least two isocyanate reactive groups, dissolved nitrogen in an amount sufficient to produce a molded product having a density of at least 0.80 g/cc.

The mixture may also contain up to 30% weight, (preferably 4–20% by weight) based upon the weight of the molded product of a reinforcing filler to enhance physical and thermal properties. It has been found that the use of the above microspheres; (i) may significantly enhance and increase the quantity/quality of dissolved nitrogen in the isocyanate-reactive component, (ii) may enable uniform density within the part, (iii) may enable the painted product to have a continuous outer skin without pitting, and (iv) may allow for significant reduction in density of the moulded polyurethane part.

A suitable polyisocyanate is an aromatic isocyanate prepolymer. Particularly preferred is the liquid 4,4'-diphenylmethane diisocyanate (MDI), diphenylmethane diisocyanate (MDI) (2,2; 2,4) and polyurethane prepolymer.

The substance reactive with the said polyisocyanate is a polyether polyol system containing minimally an aliphatic amine and an aromatic diamine. This system is a blend of hydroxyl terminated poly (oxyalkylene) polyol, diethyltoluenediamine and a polyoxypropylenediamine/metallic soap/ polyether polyol blend.

The mixture may also include a polyether siloxane surfactant, blowing agents, catalysts, surface-active additives, flame retarding agents, UV stabilizers, plasticizers, dyes, fillers, mold release agents.

When reinforcing fillers are used, as is conventional, they may be used in an amount from 4–30% weight based upon the weight of the molded part. Such a filler may be glass fibres, glass flakes, mica, wollastonite, talc, calcium carbonate, carbon fibres.

Fillers used to enable density reduction microspheres, may be used in an amount from 0.5%–6% weight based upon the weight of the molded part. The microspheres should be used in an amount enabling maximum weight reduction without detriment to its strength, impact resistance and painted appearance. The microspheres should not crush or collapse under moulding, trimming, sanding or related operations. Nor should the microspheres cause roughness or pitting on the surface of the painted product. In order to achieve these goals, the hollow microspheres should have a maximum size of 120 microns. They may have a density of 0.2–1.0 preferably of 0.38–0.60. The lower limit of compressive strength of the microspheres may be about 4,000 psi, it may be preferred that they have a compressive strength of about 10,000 psi. Examples of suitable microspheres are S-60 and/or S-38 glass microspheres marketed by 3M Industrial Specialties Division (S-60 and S-38 are Trade Marks). These commercially available microspheres are hollow thick-walled soda-lime-borosilicate glass microspheres. The particle size distribution of these types of microspheres is 50% greater than 30 microns, with no more than 8% greater than 62 microns and a maximum particle size of 88 microns. The particle size distribution of the above mentioned S-60 and S-38 microspheres is especially advantageous for polyol slurry viscosity and maintaining a continuous outer skin capable of quality painting. The compressive strength of the S-series microspheres is 10,00 psi, which is a preferred property to preventing breakage and thus pitting on the surface of the painted product.

The invention includes products made by the processes of the invention especially those products requiring to pass an on-vehicle 5 mph crash test. In order to maintain the required impact properties of the components and enable a lower density product to be made, the selection of the reinforcing filler is critical. Rrimglos I 10013, a surface modified acicular fine particle size wollastonite was found to exhibit excellent reinforcing characteristics, allow excellent paintability and gloss and provide the required impact resistance for the molded polyurethane fascias. Rrimglos, a product of Nyco Minerals Inc, (Rrimglos is a Trade Mark), has been shown to exhibit superior properties in polyurethane over a number of other common reinforcing fillers such as milled glass fibres, wollastonite etc.

The invention is further illustrated, but is not limited by the following examples in which all parts and percentages are by weight unless otherwise specified.

EXAMPLES

Example 1

An isocyanate-reactive component was prepared using 76.775 parts of polyether polyol, 16 parts of diethyltoluenediamine, 7 parts of polyoxypropylenediamine/metallic soap/ polyether, polyol, 0125 parts of catalyst T-12 and 0.10 parts of catalyst Dabco 33LV (Dabco is a Trade Mark). A polyol slurry was prepared as would normally be used in the molding of a urethane RRIM product. To the above polyol blend was added Rrimglos I 10013 (Nyco Minerals Inc.) and S-60 hollow glass microspheres (3M Scotchlite Glass Bubbles) (Scotchlite is a Trade Mark). The weight ratio of polyol blend to Rrimglos to the microspheres was 100 to 9.8 to 3.3, respectively.

The polyol slurry was charged into a RIM machine. Nitrogen was dissolved into the slurry via a sparger stone. Without the use of microspheres a void free part can be made at a slurry density nucleated to 0.70 g/cc. With the use of microspheres a void free part was made at a slurry density nucleated to 0.55 g/cc.

The slurry was combined with a commercially available aromatic isocyanate prepolymer, Mondur PF, at a ratio of 44.7 parts isocyanate to 100 parts of polyol slurry. Urethane parts were molded in the EN-114 Ford Rear steel mold (Mondur is a Trade Mark). The mold temperature was 68 deg C. The chemical temperatures were maintained at 37 to 43 deg. C. for the isocyanate and 41 to 62 deg. C for the polyol slurry. The mixing pressures were 1700 psi for each component. Urethane parts of excellent quality, physical and dimensional properties were produced. Up to a 10% density reduction was achieved over conventional RRIM reinforced with 11,25% milled glass fibre.

After heavy sanding on the wheel-well parting lines, the parts were post cured for 40 minutes at 130 deg. C. The parts were then conventionally power-washed and painted. The parts exhibited greater gloss and distinction of image (DOI) than RRIM parts reinforced with 11.25% milled glass fibre. Areas along the wheel-well which had been exposes to heavy sanding did not exhibit any "pitting" due to microsphere or skin breakage.

Example 2

An isocyanate-reactive component was prepared using 76.525 parts of polyether polyol, 16.25 parts of diethyltoluenediamine, 7 parts of polyoxypropylenediamine/metallic soap/polyether, 0.125 parts of catalyst T-12 and 0.10 parts of catalyst Dabco 33LV. A polyol slurry was prepared as would normally be used in the molding of a urethane RRIM product. To the above polyol blend was added Rrimglos I 10013 (Nyco Minerals Inc.) and S-38 hollow glass microspheres (3M Scotchlite Glass Bubbles). The weight ratio of polyol blend to Rrimglos to the microsphere was 100 to 9.8 to 2.1, respectively.

The polyol slurry was charged into a RIM machine. Nitrogen was dissolved into the slurry via a sparger stone. Without the use of microspheres a void free part can be made a slurry density nucleated to 0.70 g/cc. With the use of microspheres a void free part was made at a slurry density nucleated to 0.58 g/cc.

The slurry was combined with Mondur PF (a commercially available aromatic isocyanate prepolymer) at a ratio of 45.7 parts isocyanate to 100 parts of polyol slurry. Urethane parts were molded in the EN-114 Ford Rear steel mold. The mold temperature was 68 deg. C. The chemical temperatures were maintained at 37 to 43 deg. C for the isocyanate and 41 to 62 deg. C for the polyol slurry. The mixing pressures were 1750 psi for each component. Urethane parts of excellent quality, physical and dimensional properties were produced. Up to a 9% density reduction was achieved over conventional RRIM reinforced with 11.25% milled glass fibre.

After heavy sanding on the wheel-well parting lines, the parts were post cured for 40 minutes at 130 deg. C. The parts were then conventionally power-washed and painted. The parts exhibited greater gloss and DOI than RRIM parts reinforced with 11.25% milled glass fibre. Areas along the wheel-well which had been exposed to heavy sanding did not exhibit any "pitting" due to microsphere or skin breakage.

Example 3

An isocyanate-reactive component was prepared using 72.775 parts of polyether polyol, 20 parts of diethyltoluenediamine, 7 parts of polyoxypropylenediamine/metallic soap/polyether, 0.125 parts of catalyst T-12 and 0.10 part of catalyst Dabco 33LV. A polyol slurry was prepared as would normally be used in the molding of a urethane RIM product. To the above polyol blend was added S-60 hollow glass microspheres (3M Scotchlite Glass Bubbles). The weight ratio of polyol blend to the microsphere was 100 to 0.80, respectively.

The polyol slurry was charged into a RIM machine. Nitrogen was dissolved into the slurry via a sparger stone. Without the use of microspheres a void free part can be made at a slurry density nucleated to 0.65 g/cc. With the use of microspheres a void free part was made at a slurry density nucleated to 0.62 g/cc.

The slurry was combined with Mondur PF (a commercially available aromatic isocyanate prepolymer) at a ratio of 58.5 parts isocyanate to 100 parts of polyol slurry. Urethane parts were molded in the SN-95 Mustang GT steel mold. The mold temperature was 68 deg. C. The chemical temperatures were maintained at 37 to 43 deg. C for the isocyanate and 41 to 62 deg. C for the polyol slurry. The mixing pressures were 1500 psi for each component. Urethane parts of excellent quality, physical and dimensional properties were produced. A 5% weight reduction was achieved over unfilled RIM.

We claim:

1. A low density rigid article of foamed polyurethane having an outer continuous surface skin, the article being the reaction product of a mixture of a polyisocyanate and an isocyanate-reactive component, the product including from 0.5% to 6% by weight of hollow glass microspheres having a maximum size of 120 microns and a compressive strength of at least 4,000 psi.

2. A low density rigid article as claimed in claim 1 having a density of at least 0.80 g/cc in which polyisocyanate-reactive component comprises:
   (i) at least one compound containing two isocyanate reactive groups, and
   (ii) dissolved nitrogen in an amount sufficient to produce a molded product having a density of at least 0.80 g/cc.

3. A low density rigid article as claimed in claim 2 having a density in the range of from 0.80 g/cc to 1.10 g/cc.

4. A low density rigid article as claimed in claim 1 which also includes from 4–30% of an inorganic reinforcing filler.

5. A low density rigid article as claimed in claim 2 in which the hollow glass microspheres have a size from 40 to 90 microns.

6. A low density rigid article as claimed in claim 2 in which the hollow glass microspheres have a density of 0.2 to 1.0 g/cc.

7. A low density rigid article as claimed in claim 6 in which the hollow glass microspheres have a density of 0.38 to 0.6 g/cc.

8. A low density rigid article as claimed in claim 1 which contains about 2% by weight of the hollow glass microspheres.

9. A low density rigid article as claimed in claim 1 in which the hollow glass microspheres have a compressive strength of about 10,000 psi.

* * * * *